Dec. 12, 1950     B. GOLDMAN     2,533,241
APPARATUS FOR COMMINUTING AND MIXING MATERIALS
Filed June 12, 1946     2 Sheets-Sheet 1

INVENTOR.
Bronislaw Goldman
BY *William B. Jaspert*
Attorney.

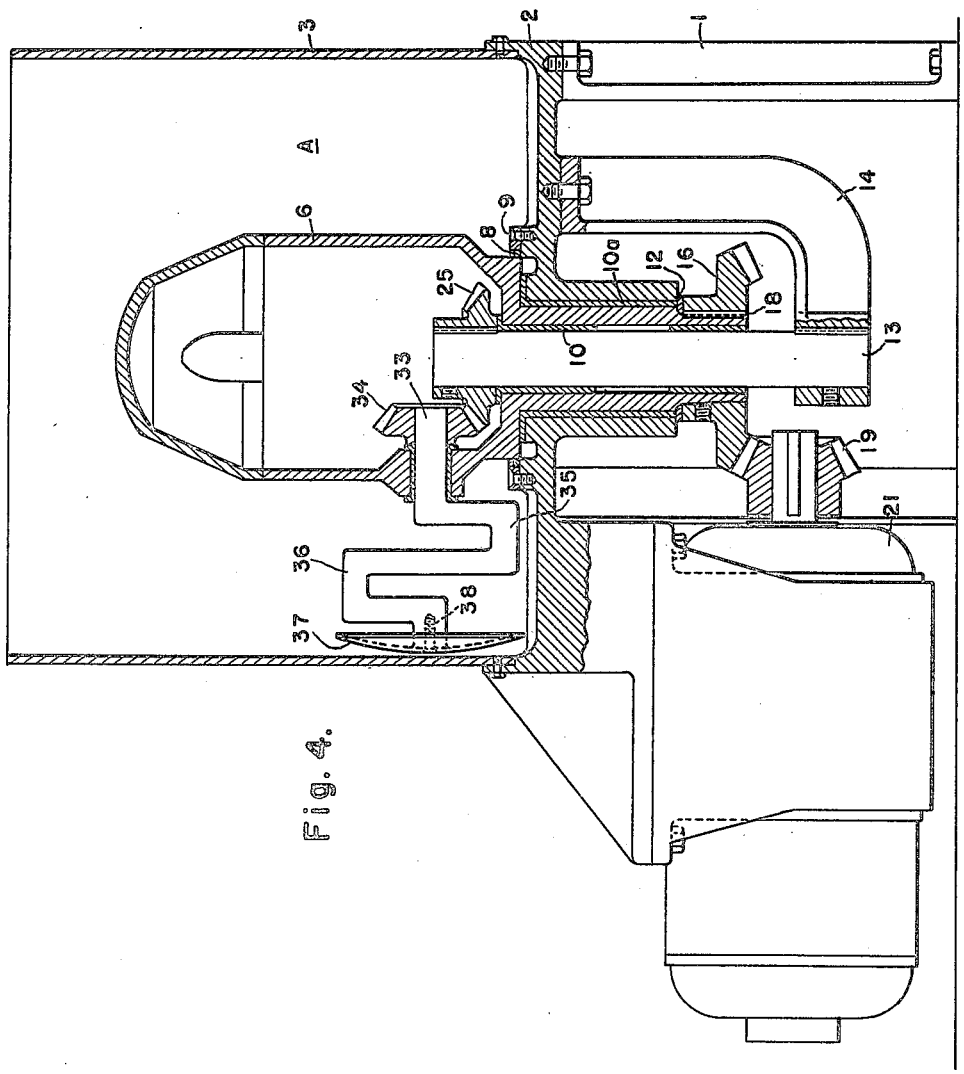

Patented Dec. 12, 1950

2,533,241

UNITED STATES PATENT OFFICE 2,533,241

APPARATUS FOR COMMINUTING AND MIXING MATERIALS

Bronislaw Goldman, Pittsburgh, Pa.

Application June 12, 1946, Serial No. 676,234

3 Claims. (Cl. 259—102)

This invention relates to new and useful improvements in mixing and/or kneading machines for mixing and/or kneading dough or for other industrial applications, such as beating pulp or the like, and it is among the objects thereof to provide a mixer in which the material is charged into a cylindrical stationary chamber and the mixing element is designed to engage and act upon the charged mass while traveling in a circular path within said chamber.

Another object of the invention is to provide a mixing device of the above designated character utilizing a disc which is so disposed as to cut through the entire cross section of the charged material and move the material through a vertical cycloidal path.

Figure 1:
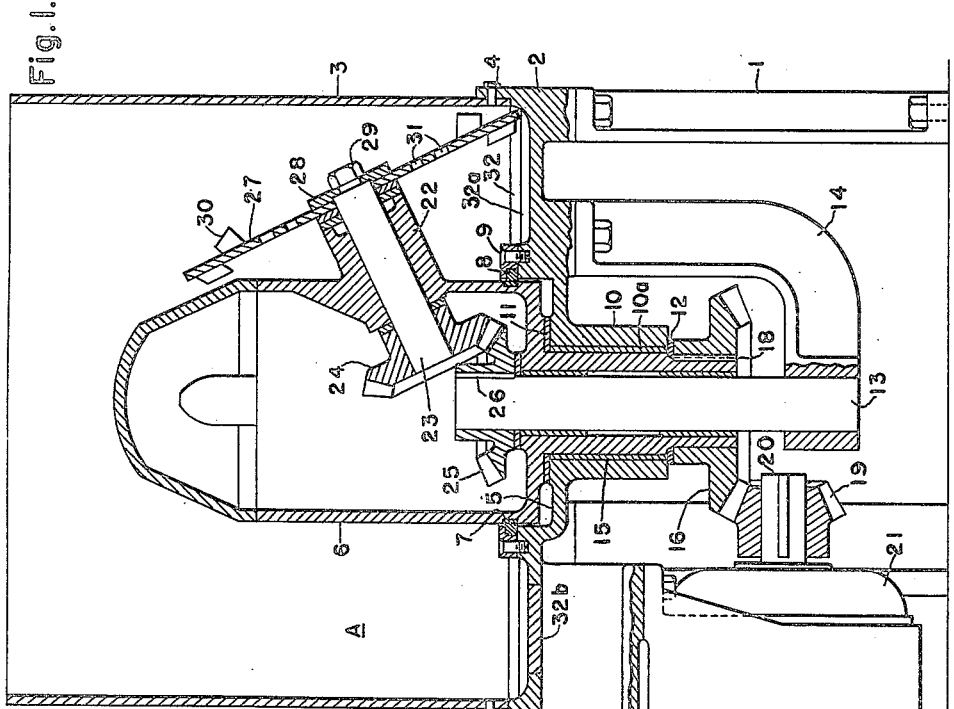
Figure 2:
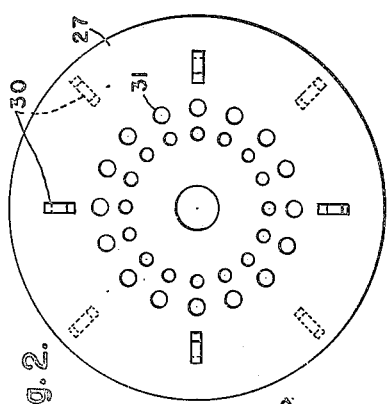
Figure 3:
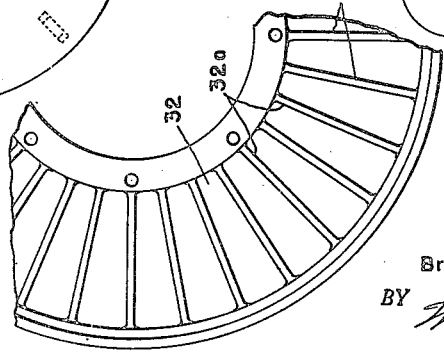

These and other objects of the invention will become more apparent from a consideration of the accompanying drawings in which like reference characters designate like parts, and in which Fig. 1 is a vertical cross sectional view of a mixing device embodying the principles of this invention;

Fig. 2 a front elevational view of a mixing disc;

Fig. 3 a top plan view of a portion of the bottom of the mixing chamber of Fig. 1; and Fig. 4 a vertical cross sectional view of a modified form of mixing machine.

With reference to Figs. 1 and 2 of the drawings, the structure therein illustrated comprises a frame 1 on which is mounted a table 2 having a cylindrical housing 3 secured thereto by bolts 4, the frame, table and housing being stationary. The table 2 is provided with a well 5 for receiving a cylinder 6, a packing 7 being provided to seal off the material charged in the container 3, the packing being secured by an annulus 8 and screws 9. Cylinder 6 is rotatably journaled on bearings 10 and is supported on end bearings 11 and 12. Journal bearings 10 and 10a are mounted on a stationary shaft 13 which is fixed to a bracket 14 forming an extension of the table 2. The sleeve 15 of the cylinder 6 is driven by a bevel gear 16 that is keyed to the sleeve 15 at 18, bevel gear 16 being driven by a pinion 19 on shaft 20 of a drive motor 21.

The rotating cylinder 6 is provided with a bearing bracket 22 for journaling the shaft 23 on which is keyed a bevel gear 24 that interacts with the teeth of a bevel gear 25 that is keyed to the stationary shaft 13 at 26. A mixing disc 27 is mounted on the end of shaft 23 and is secured thereon by end washers 28 and nut 29.

Bearing bracket 22 is inclined to dispose the mixing disc 27 at an angle extending from the groove in table 2 to the top of cylinder 6 across the entire cross sectional area of the annular mixing chamber in which the material is charged.

The mixing disc 27 is provided with upstruck members or lugs 30 that are angularly spaced to aid in the impelling movement of the material acted upon and to thoroughly mix the same, and may be perforated as shown at 31.

The grooved portion 32 of table 2 may be roughened by the use of knives or serrations 32a as shown in Fig. 2. Removable plugs or covers 32b are provided to open when the material is ready for discharging. A conventional scraper (not shown) may be used for the purpose.

The operation of the mixing device of Figs. 1 and 2 is briefly as follows.

The material is charged in the annular space designated by the character A of the cylindrical vat or container 3. Motor 21 is energized to drive the cylinder 6 upon rotation of which the mixing or stirring disc 27 will rotate while traveling through the circular path of the annular chamber A. Any point on the periphery of disc 27 will, while rotating, generate a cycloidal curve and the material acted upon will similarly be subjected to displacement in a vertical cycloidal path resulting in thorough mixing of the charged material. The lugs or vanes 30 aid in effecting the displacing action of the disc, although they may be entirely eliminated, as the disc itself, because of its angular disposition and movement in the mixing chamber, assures a thorough and efficient mixing of the charged material in a minimum length of time.

When the disc 27 is provided with perforations 31 the mass acted upon will be displaced through the perforations in one direction at the bottom and in the opposite direction at the top of the disc. This is so because at the bottom of the disc the material is displaced by pressure from the container wall 3 inward through the perforations and at the top by pressure of the mass reacting from its displacement by the wall of cylinder 6.

With reference to the structure shown in Fig. 4 of the drawing, the frame, housing, cylinder and cylinder drive are the same as in Fig. 1 of the drawings, but the mixing element consists of a crank shaft 33 having a bevel gear 34 that interacts with the teeth of bevel gear 25. Crank shaft 33 is provided with cranks 35 and 36 and a convex shaped disc 37 is secured to the end of the crank shaft 33 by a screw 38. The cranks 35 and 36, together with the disc, fill the annular space A between the container 3 and the cylinder 6 so that while traveling and simultaneously revolving in its travel through the annular chamber A, all of the charged material is subjected to a thorough mixing and pressure action. The form of the device shown in Fig. 3 may be more suited for mixing or beating certain materials, it being more in the nature of a kneader and mixer combined which may be especially adapted for mixing materials of certain characteristics.

It is evident from the foregoing description of the invention that mixing machines made in accordance therewith are of rugged and simple construction and adapted for a variety of uses, and although several embodiments of the invention have been herein illustrated and described, it will be evident to those skilled in the art that various modifications may be made in the details of construction without departing from the principles herein set forth.

I claim:

1. A mixing device comprising a cylindrical container having a cylinder mounted centrally thereof forming an annular mixing chamber with the wall of the container, a disc journaled in said cylinder, said disc having its axis inclined from a horizontal plane, whereby the face of the disc extends from the cylinder at the top to the periphery of the container at the bottom across the annular mixing chamber, means for rotating said cylinder and thereby revolve said disc to subject the material in the annular mixing chamber to a mixing movement in a cycloidal path, said disc having perforations for allowing transverse flow of the material in opposite directions above and below the disc axis.

2. A mixing device comprising a cylindrical container having a cylinder mounted centrally thereof forming an annular mixing chamber with the wall of the container, a disc journaled in said cylinder, said disc having its axis inclined from a horizontal plane, whereby the face of the disc extends from the cylinder at the top to the periphery of the container at the bottom across the annular mixing chamber, means for rotating said cylinder and thereby revolve said disc to subject the material in the annular mixing chamber to a mixing movement in a cycloidal path, said disc having impellers and being perforated to allow transverse flow of the material in opposite directions above and below the disc axis.

3. In a mixing device, an upright cylindrical container having a circular base, a mixing and cutting disc journaled on a shaft coincident with the axis of the container for movement in a circular path in said container with the periphery of the disc adjacent the bottom of the container, the face of the disc extending from the point of convergence of the wall and base of the container and being inclined toward the axis of the container, and means for revolving said disc while traveling in the circular path of said container.

BRONISLAW GOLDMAN.

REFERENCES CITED

The following references are of record in the file of this patent:

UNITED STATES PATENTS

| Number | Name | Date |
| --- | --- | --- |
| 400,061 | Curtis | Mar. 26, 1889 |
| 441,867 | Fitch | Dec. 2, 1890 |
| 576,296 | Ball | Feb. 2, 1897 |
| 844,085 | Barthelmess | Feb. 13, 1907 |
| 1,362,948 | Lehrack | Dec. 21, 1920 |
| 1,512,536 | Hibbins | Oct. 21, 1924 |
| 1,934,970 | Davis | Nov. 14, 1933 |

FOREIGN PATENTS

| Number | Country | Date |
| --- | --- | --- |
| 48,187 | Germany | Aug. 15, 1889 |
| 508,877 | Great Britain | July 7, 1939 |